United States Patent [19]
Shearer et al.

[11] Patent Number: 6,108,587
[45] Date of Patent: Aug. 22, 2000

[54] INJECTION MOLDING CONTROLLER WITH MACHINE MODELING

[75] Inventors: Jeffrey A. Shearer, Fremont; David M. Fort, Lyndhurst; Robert E. Davitt, Jr., Northfield Center; Robert B. Meeker, Brook Park, all of Ohio

[73] Assignee: Rockwell Technologies, LLC, Thousand Oaks, Calif.

[21] Appl. No.: 08/989,014

[22] Filed: Dec. 11, 1997

Related U.S. Application Data

[60] Provisional application No. 60/032,653, Dec. 11, 1996.

[51] Int. Cl.⁷ .................................................... G06F 19/00
[52] U.S. Cl. .......................................... 700/200; 425/145
[58] Field of Search .................................. 700/203, 200; 425/145

[56] References Cited

U.S. PATENT DOCUMENTS

| | | | |
|---|---|---|---|
| 5,062,785 | 11/1991 | Stroud, III et al. ..................... | 425/145 |
| 5,182,716 | 1/1993 | Stroud, III et al. ..................... | 700/203 |
| 5,258,918 | 11/1993 | Giancola ................................. | 700/203 |
| 5,786,999 | 7/1998 | Spahr et al. ............................ | 700/200 |

*Primary Examiner*—William Grant
*Assistant Examiner*—Chad Rapp
*Attorney, Agent, or Firm*—Keith M. Baxter; John J. Horn; William R. Walbrun

[57] ABSTRACT

An industrial controller for injection molding machines models the injection molding machine by observing ram state in response to control variables to alert the user when a control profile may be physically unrealizable and to inhibit a learning process to avoid extreme actuation of the controlled components such as may be detrimental to later control accuracy. Simultaneous velocity and pressure control of the ram, with separate profiles, may be obtained by open-loop control of either pressure or velocity and continuous closed-loop control of the other control variable.

15 Claims, 5 Drawing Sheets

INJECTION MOLDING CONTROLLER WITH MACHINE MODELING

CROSS-REFERENCE TO RELATED APPLICATIONS

This applications claims the benefit of provisional application Ser. No. 60/032,653 filed Dec. 11, 1996

STATEMENT REGARDING FEDERALLY SPONSORED RESEARCH OR DEVELOPMENT

BACKGROUND OF THE INVENTION

The present invention relates to industrial controllers and more specifically to controllers for injection molding machines.

In injection molding using an injection molding machine, a plasticized material is held in a "barrel" and forced under pressure, typically by means of a ram fitting within the barrel, through a nozzle in one end of the barrel. The plasticized material enters into a mold cavity under pressure where it solidifies into a molded part in conformance with the dimensions of the mold cavity. The part is then ejected from the mold and the process is repeated.

The injection molding process may be broken into a number of stages including: plastication, injection, packing and holding. Additional stages and subdivisions of these stages may also be employed. In the plastication stage, solid pellets of the molded material are typically fed into the barrel where they are melted and forced to the front of the barrel by rotation of a screw forming part of the ram. As the molding material is melted by mechanical action of the screw, the barrel begins to fill moving the screw and ram back from the nozzle. Control of the ram back pressure may be used to ensure the melted molding material is at the proper temperature and free from voids or air pockets.

In the injection stage, the rotation of the screw ceases and the ram is moved toward the nozzle to force the molding material through the nozzle into the mold cavity. The characteristics of the molding material, or of the mold, may require that certain parts of the mold cavity be filled at different rates. This may be accomplished by varying the speed or pressure of the ram during the injection stage.

In the packing stage, additional molding material is forced into the mold cavity to accommodate shrinkage of the molding material as it cools in the mold cavity.

In the holding stage, pressure is maintained on the molding material to control its density and/or flexibility. Control of the ram pressure during the holding stage may also prevent distortions of or depressions in the part as it cools. At the conclusion of the holding stage the molded part shrinks away from the mold cavity prior to ejection of the part.

The ability to accurately vary the ram pressure and velocity during the various stages of the injection molding cycle may be accomplished by a controller programmed with "profiles" comprised of sequential "segments" having different setpoints for the injection process. A given profile may have multiple segments and setpoints to allow the programming of complex molding pressure or velocity functions during a given stage of the injection process. At any given stage of the injection molding cycle, the user will provide a profile for controlling one process variable, (e.g., ram velocity, ram pressure, or cavity pressure) depending on the desired control strategy. The remaining process variables are either left uncontrolled or set to a baseline value.

The ability to use multiple segments in a profile requires that the injection molding machine respond rapidly to the setpoint in each segment. High speed control may be obtained by operating the injection molding machine in an open loop configuration. In an open loop configuration, the setpoint is converted into an electrical signal that when applied to the injection machine, for example, a hydraulic valve of the injection molding machine, produces a desired control variable value that will realize the setpoint's ram velocity or pressure. The conversion of the setpoint to an electrical value is based on empirical, a priori measurements of the valve's performance.

Although open loop control provides rapid response of the injection molding machine and ensures stability, the accuracy of the control is low. The reason for this is that the transfer function relating ram velocity or pressure to valve actuation is complex and subject to variations caused by numerous factors including the molding temperature, the mold type, and the composition of the plastic molding material.

For this reason, it is known to combine open loop control with "learning" in which the setpoint for each segment is compared with a fed back process variable value indicating the actual state of the ram at the conclusion of that segment. The difference is used to augment the control variable derived from the setpoint value for the next injection control cycle. Thus, if the ram fails to reach a desired pressure or velocity, the control variable is changed on the next cycle so that the ram's state at the conclusion of the segment in the next cycle better matches the original setpoint.

Another method for improving the accuracy of the open loop control is a hybrid open loop/closed loop system in which open loop values are provided to the ram and after a time, the loop is closed to eliminate residual errors. Closing the loop means that a measured process variable (e.g., ram position or ram pressure) is compared to the setpoint during a given segment and the injection molding machine receives a control signal proportional to the difference between the setpoint and the actual ram state.

Both of these methods of learning and combined open loop and closed loop control are described generally in U.S. Pat. No. 5,062,785 entitled: "Injection Molding Controller With Process Variable Learning" assigned to the same assignee as the present invention and hereby incorporated by reference.

While these approaches improve the control accuracy of the injection molding process, they are not wholly satisfactory in providing rapid and accurate ram control.

BRIEF SUMMARY OF THE INVENTION

The present inventors have recognized that in some situations, open loop control with learning can degrade control accuracy. If, for example, the injection molding machine is physically unable to respond to the profile, learning can cause a "winding up" of the control variable, for example an increasing opening of a particular valve, despite the impossibility of the desired process variable being realized. Over correction at one segment can cause a loss of control accuracy at a subsequent segment as the controlled machinery attempts to respond to widely varying control signals. The effect of learning can also disguise normal wear of components by correcting for their inaccuracy or inconstancy. In the extreme case, learning may increase catastrophic failure of portions of the control chain whose loss of function would otherwise have been detected.

The inventors have also recognized that there may be instances where it is desirable to provide control profiles for both ram velocity and pressure at the same time, and that this may be done, with acceptable control accuracy, by operating one profile in open loop and the other profile in a closed loop. Preferably, ram velocity may be controlled with closed loop control while ram pressure may be controlled with open loop control based on empirical measurements of the relationship between pressure control outputs and pressure. This open loop pressure relationship may be determined when the ram is immobilized in a "deadheaded" situation.

In accordance with these observations, the inventors have provided an improved controller for an injection molding machine. Specifically the controller includes input circuitry receiving a process variable signal (e.g., pressure or position) indicating the state of the ram of the injection molding machine, and output circuitry providing a ram control signal to the injection molding machine. The controller also includes an electronic memory storing a user defined control profile. An electronic computer receives the control profile, the process variable signal, and executes a stored program to monitor the process variable signal during the operation of the injection molding machine to model the dynamics of the injection molding machine. The user's control profile is then compared against the model to generate an indication to the user as to whether the control profile is physically achievable by the injection molding machine.

It is thus one object of the invention to provide an indication to the user that the control profile is outside the operation boundaries of the injection molding machine so as to improve the user's development of a control profile. For example, the indication that segments of the control profile cannot be executed by the machine will prevent the user from further increasing the setpoint of that segment in a vain attempt to achieve that process variable.

The electronic computer, when executing the stored program, may read control setpoints corresponding to multiple segments in the control profile to produce control signals. The computer may correct the control signals for a subsequent cycle of the injection molding machine based on the operation of the injection molding machine in a current cycle, only if, the control profile is determined to be physically achievable.

Thus it is another object of the invention to prevent an over correction of the output control variables when it is physically impossible for the injection molding machine to follow a control profile. By preventing extreme actuation of the valves, for example, for segments whose setpoints cannot be achieved, control for subsequent segments is not disrupted and better control is obtained.

The electronic computer may further generate an indication to the user if a corrected control variable signal exceeds a predetermined deviation from a baseline control variable signal.

Thus, it is another object of the invention to monitor the extent of the correction provided by the control system's learning so that components on the injection molding machine which need replacement or repair may be detected. While a certain degree of learning accommodates normal variables in the injection molding process, such as the warming up of the machine or different viscosities of plastic material, correction outside this range may indicate malfunction of a part.

After the electronic computer has modeled the injection molding machine, it may determine a transient time between providing a control signal and a response by the injection molding machine. Control signals corresponding to multiple segments in the control profile may be corrected for a subsequent cycle of the injection molding machine based on the operation of the injection molding machine in a current cycle during each segment but after the transient time.

Thus it is another object of the invention to improve the accuracy of learning by eliminating transient periods in the response of the machine from those calculations.

The controller may provide both a pressure control signal and a velocity control signal to the injection molding machine. And the electronic memory may store the user defined pressure profile and a user defined velocity profile each having multiple corresponding segments defining a sequence of independent pressures and velocities. The electronic computer may execute its program to simultaneously read the segments of the pressure profile and the velocity profile and output corresponding pressure control signals and velocity control signals to the injection molding machine based on the read segments.

Thus it is another object of the invention to allow simultaneous control of pressure and ram velocity according to multi-segment profiles during the operation of the injection molding machine. Typically, closed loop velocity control and open loop pressure control will be used. Such control strategy may allow rapid initial ram response (with high pressures) while limiting later pressure and hence packing of the mold.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENT

Injection Molding Machine Components and Operation

Figure 1:
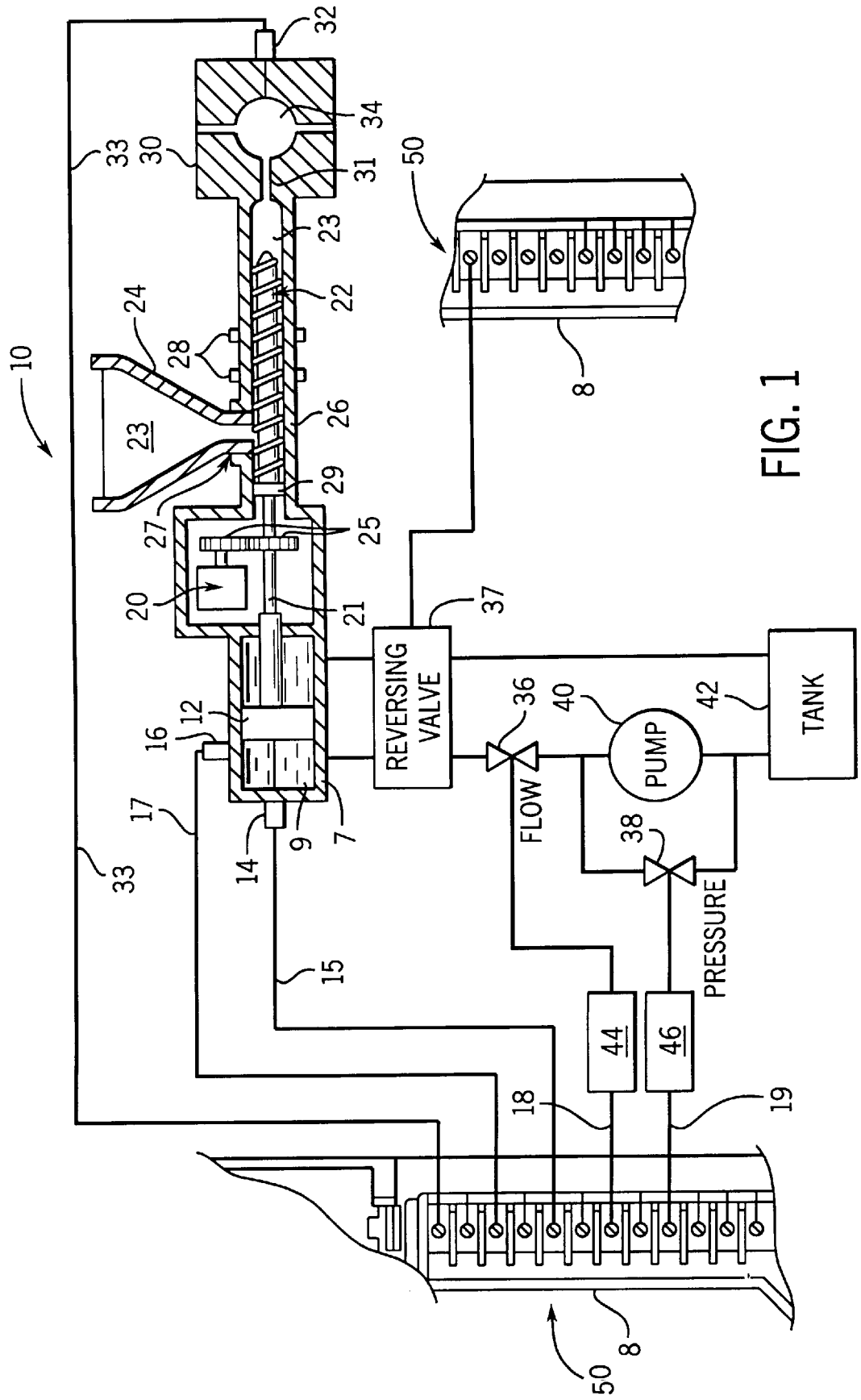
FIG. 1 is a block diagram of the terminals of an injection molding machine employing a hydraulic ram as may be controlled by the controller of the present invention and showing the connections therebetween.

Referring now to FIG. 1, an injection molding machine 10 includes a hydraulic piston 12 having its front face connected to a ram 29 having a screw 22. The piston 12 fits so as to slide within a cylinder 7, dividing the cylinder 7 into a front and rear chamber each filled with hydraulic fluid 9. Each chamber communicates with a hydraulic system, to be described in more detail below, so as to controllably move the piston 12 within and along the cylinder 7. A position transducer 14 provides an electrical signal indicative of the position of the piston 12, and hence the position of the ram 29, and a pressure transducer 16 providing an electrical signal indicative of the pressure acting on the rear face of the piston 12.

A spline shaft 21 connects the front face of the piston 12 to ram 29 fitting within the barrel 26. The shaft 21 serves to move the ram 29 longitudinally within the length of the barrel 26 upon motion of the piston 12. The screw 22 on ram 29 may also be rotated along its axis within the barrel 26 by means of a gear train 25 engaging the spline shaft 21 and rotating the shaft 21 and screw 22 by means of motor 20.

During the plastication stage of the injection molding cycle, the ram 29 and hence the screw 22 is rotated within barrel 26 to feed macerated plastic material 23 into the barrel 26 from a hopper 24 communicating with the inside of the barrel 26 by means of aperture 27. The mechanical action of the screw 22 upon the plastic material 23 in conjunction with the heat supplied by barrel heaters 28 attached to the outer surface of the barrel 26 serves to melt or plasticize the plastic material. As the plastic material 23 fills the space between the barrel 26 and the ram 29, the action of the screw 22 forces the ram 29 longitudinally rearward. This motion may be accompanied by a countervailing back pressure by piston 12 to prevent the formation of voids in the plasticized material 23, as has been described.

When sufficient material 23 has been plasticized (a "shot") to permit the molding of a part, the mold 30 is opened, the previous part (if any) is ejected, the mold 30 is closed and the back pressure on the piston 12 is increased driving the ram 29 longitudinally forward.

The front of the barrel 26 has a nozzle 31 through which the plasticized material 23 is injected into the mold cavity 34 formed by the closed halves of the mold 30. A mold cavity pressure transducer 32 may provide a process variable signal 33 corresponding to the pressure of the plasticized material 23 against the walls of the mold 30. The pressure signal described below may be generally either the ram or cavity pressure signals.

The hydraulic system controlling the piston 12 position, and hence the ram 29 position, includes a hydraulic pump 40, electrically actuated flow and pressure valves 36 and 38, and an electrically actuated "reversing" valve 37. The pressure valve 38 shunts the hydraulic pump 40 to control the pressure seen by the flow valve 36 which connects the outlet of the pump 40 to the front or rear chamber of the ram cylinder 7 depending on the position of the reversing valve 37. The remaining chamber is connected, via reversing valve 37, to a hydraulic storage tank 42 which returns hydraulic fluid to the hydraulic pump 40.

As described, the reversing valve 37 controls which chamber of the ram cylinder 7 receives the flow from flow valve 36 and which chamber of the ram cylinder 7 returns to the storage tank 42. Hence the reversing valve 37 controls the direction of the piston 12 movement.

As is understood in the art, the pressure valve and flow valve 38 and 36 are valves that have been designed to have improved performance, i.e., linearity and response time, for the particular dimension, pressure or rate of flow being controlled. The flow and pressure valves 36 and 38 are driven by valve amplifiers 44 and 46, respectively, such as are typically associated with commercially available valves of this type.

Industrial Controller

During the operation of the injection molding machine, both valves may be controlled to receive control variable ("CV") signals 18 and 19 from an I/O module 8 of an industrial controller 50d. The CV signal 18 is connected to valve amplifier 44, and hence to flow valve 36 while the CV signal 19 is connected to valve amplifier 46 and hence to pressure valve 38. The CV output signals 18 and 19 are generated by the controller according to a stored program and in response to process variable signals ("PV") 15, 17 and 33 from the position and pressure transducers 14, 16 and 32 attached to the injection molding machine 10.

Figure 2:
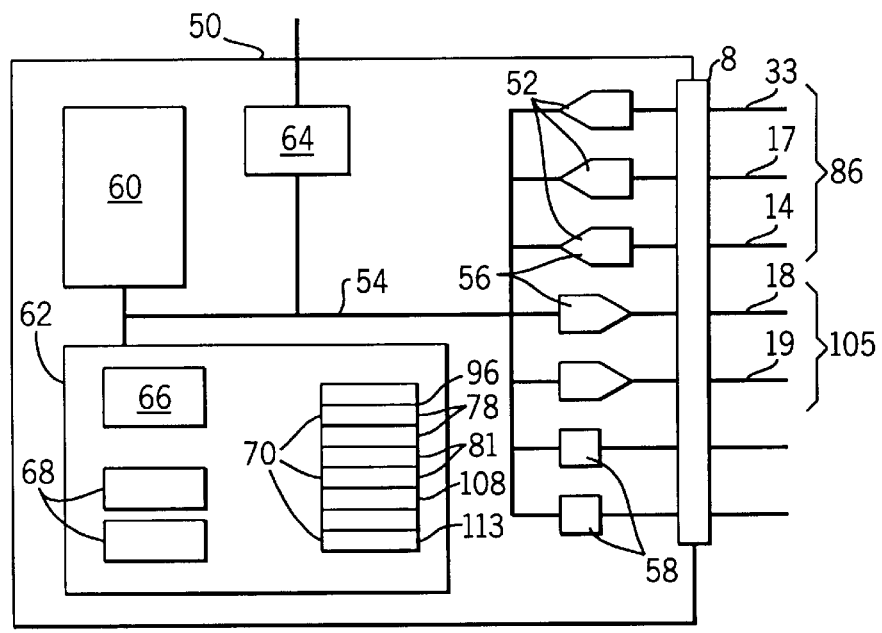
FIG. 2 is a schematic representation of the principle components of the controller including a memory for storing a control program and various control profiles.

Referring now to FIG. 2, the I/O modules 8 provide for the receipt of analog process variable signals 15, 17 and 33 via analog to digital converters 52 providing digital words to an internal bus 54 of the industrial controller 50. Digital words on the bus 54, in contrast, may be provided to digital to analog converters 56 producing control variable signals 18 and 19. Latches 58 may receive digital words from the bus 54 to provide for binary or on/off outputs such as to the reversing valve 37.

The bus 54 also connects to a processor 60, which may be a single chip microprocessor well known in the art, and to an electronic memory 62. The memory 62 may store a control program 66 to be executed by the processor 60. The memory 62 also provides a variable storage area 68, and holds one or more profiles 70 as will also be described. A terminal interface 64 connects to bus 54 to provide a means for a programming terminal or the like (not shown) to be attached to the controller 50 for programming the controller 50 or for a user to enter profiles as will be described.

Generally during operation of the industrial controller 50 with the injection molding machine 10, the processor 60 will execute the control program 66 and according to values stored in the profiles 70 and the process variables 33, 17 and 14, will determine control variables 18 and 19 to effect control of the injection molding machine 10.

Figure 3:
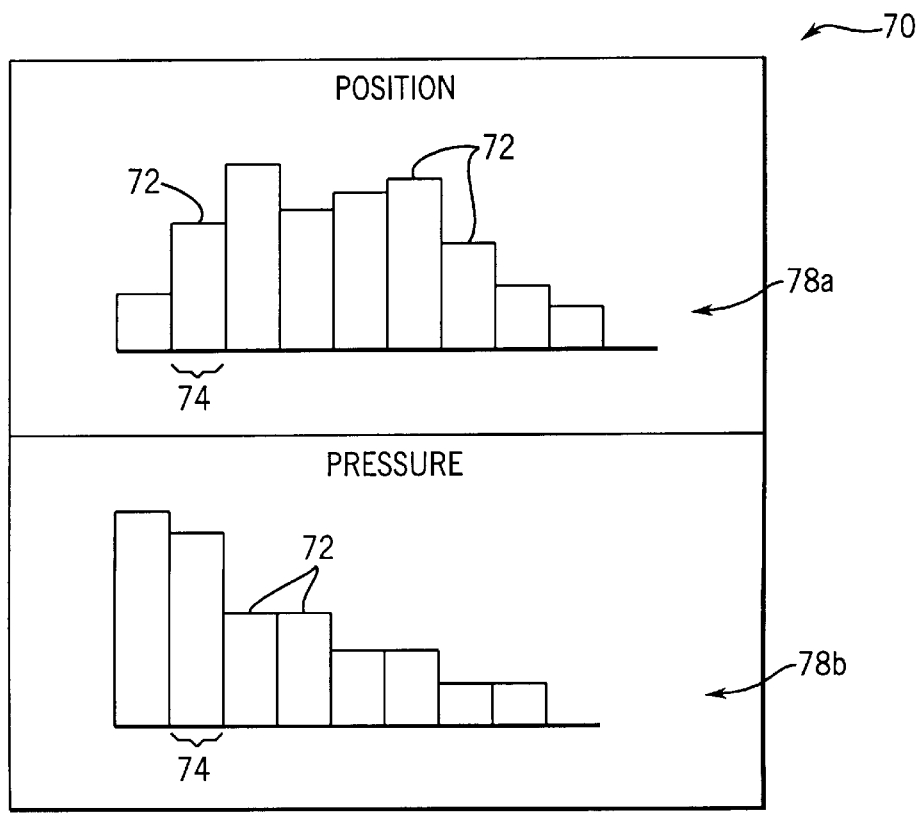
FIG. 3 is a detailed graphical representation of one of the control profiles of FIG. 2 showing corresponding velocity and pressure profiles.

Referring now to FIGS. 2 and 3, one profile 70 is a setpoint profile 78 providing an array of memory elements that hold values of setpoints 72 (e.g., ram pressure or ram velocity) arranged by segments 74. In the present invention, two setpoints 72 may be provided for each segment 74, a pressure and velocity setpoint 72. Thus two profiles, a velocity and pressure profiles 76 and 78 are provided having corresponding segments 74. During the control of the injection molding machine, a profile (either pressure or velocity or both) for each stage of the injection cycle will be read by the processor 60 to produce control variables 18 and 19 accordingly.

Operation of the Control Program

Figure 4:
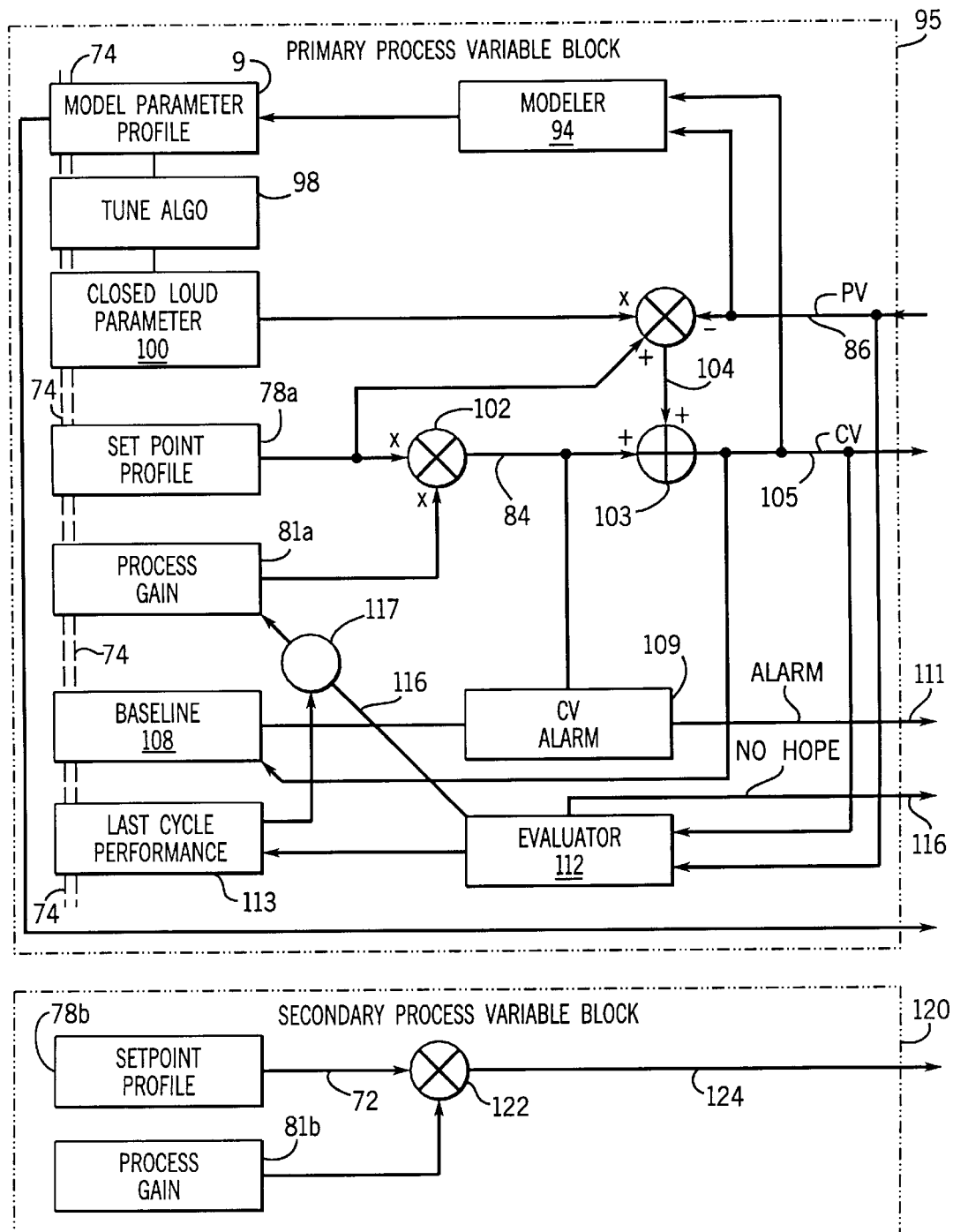
FIG. 4 is a function block diagram of the operation of the present controller in producing control signals for the injection molding machine in conformance with a model of the machine developed by monitoring signals from the injection molding machine.
Figure 6:
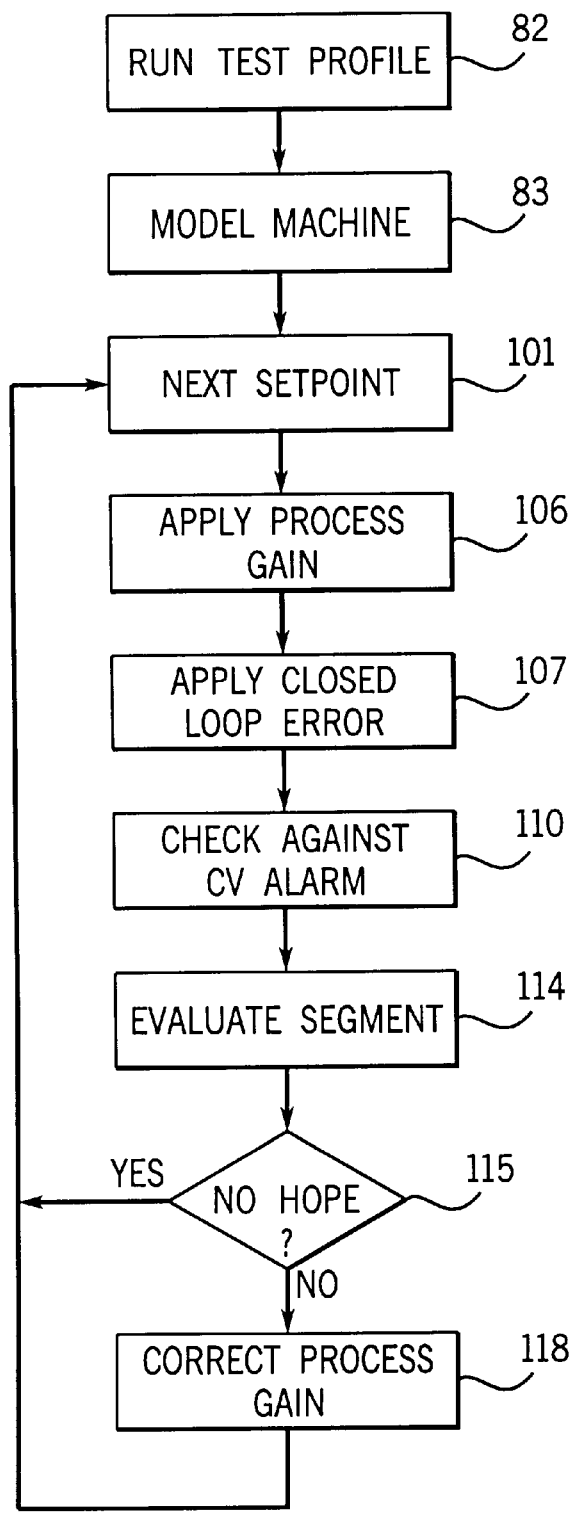
FIG. 6 is a flowchart depicting the steps of the control program executed by the controller of the present invention.

Referring now to FIGS. 4 and 6, in the present invention, the control program 66 permits a test profile, stored for example in setpoint profile 78a the primary process variable block 95 implemented by program 66, be run by the injection molding machine 10, as indicated at a first process block 82. This test profile may be a simple step function of one process variable and is used to determine the physical capabilities of the injection molding machine 10. The test profile is run by reading its setpoints 72a in sequence and outputting an open loop control variable 84 based on these setpoints 72a to the injection molding machine 10. Thus for the process variable of pressure, pressure setpoint values 72*a* are mapped to percent valve openings according to gain values 81*a* based on a priori knowledge about the operation of the valves 36 and 38 and the pump 40 previously entered by the user. For the process variable of pressure, the test profile of process block 82 is ideally run with the piston 12 fully extended so that there is no motion of the ram 29. Eliminating motion of the ram 29 ("deadheading the ram") provides superior pressure measurements as it eliminates the dynamic effects of flowing hydraulic fluid such as may create pressure drops and inhomogeneous pressure distributions in the cylinder 7. For the process variable of velocity, the test profile of process block 82 is ideally done with a charge of plastic material in the barrel 26 as with a normal injection cycle.

Figure 5:
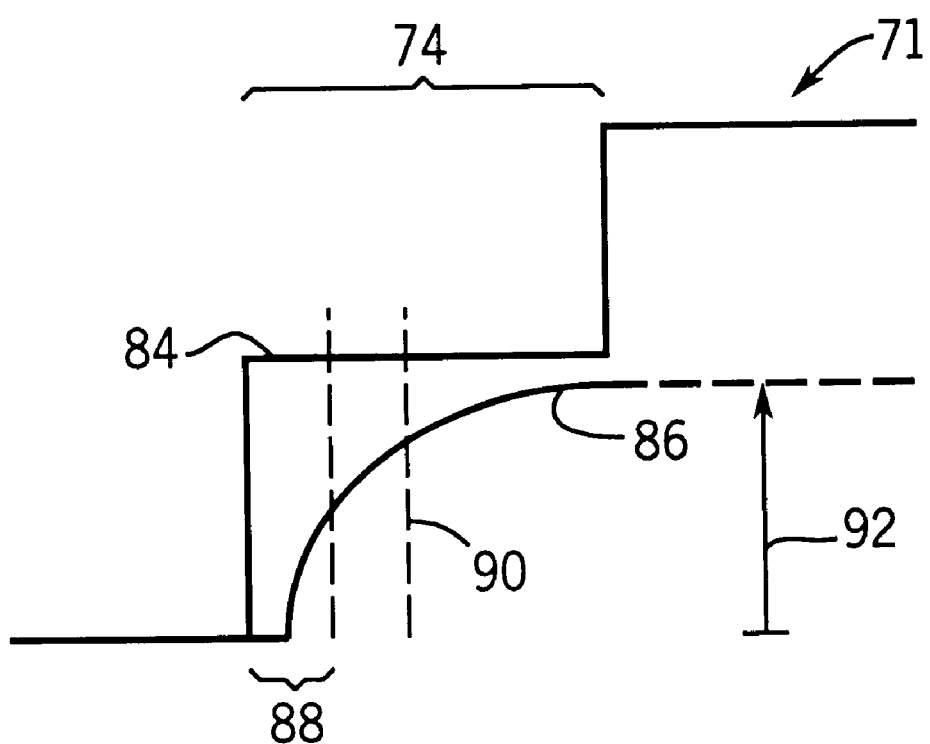
FIG. 5 is a graphical representation of a control output plotted against a fed back process variable signal illustrating the modeling the injection molding machine.

Referring now momentarily to FIG. 5, as mentioned, a test profile provides a step function control variable 84 during segment 74. During the segment 74, a process variable 15, 17, or 33, fed back to the controller (as signal 86) is monitored by the processor 60. Generally as depicted, the signal 86 will lag behind the control variable 84 by a dead time 88 and will have a measurable time constant 90 and will change according to a steady state gain 92.

From this data, as indicated by process block 83 of FIG. 6, the physical capabilities of the injection molding machine 10 are delineated. A model is thus derived comprising three principal components: the dead time 88 which may be simply measured from the difference between the beginning of the segment 74 and a predetermined percent response by the signal 86, a time constant value 90 determined as a function of the time from the end of the dead time 88 to a second predetermined percent response and a steady state gain 92 determined by total control variable change.

As shown in FIG. 4, the process of monitoring the process variables (e.g. pressure or position) and the control variables is performed by a modeler 94 in the primary process variable block 95. 83 The process of the modeling is indicated in FIG. 6 by process block 83. The modeler 94 deduces the quantities described with respect to FIG. 5 of deadtime 88 and time constant 90 and gain 92 and stores them in a model parameter profile 96.

For the test profile, a single model parameter profile will be generated. However, this model parameter profile 96 will be updated during actual operation of the controller 50, during the injection molding of parts, so that a separate set of parameters may be obtained for each segment of the setpoint profile 78. This is possible because the profile 78 will generally be comprised of a series of step functions, each of which will yield the parameters of FIG. 5.

These model parameters 96 are operated on by any one of a number of tuning algorithm 98 well known in the art, to deduce a closed loop parameter 100 for each segment of the setpoint profile 78. The tuning algorithms 98 may determine proportional, integral, or derivative control loop factors as are well known in the art, however, in the preferred embodiment, only the proportional factor is determined and stored in the closed loop parameter 100.

At process block 101 of FIG. 6, the controller 50 may begin the process of controlling the injection molding machine 10 to fabricate a part per the setpoint profile 78*a* as has been previously entered by a user. Each setpoint 72 for a segment 74 (shown in FIG. 3) in setpoint profile 78*a* is sent to multiplier 102 which multiplies it by a process gain from a process gain profile 81*a* having gain values originally entered by the user so as to convert each setpoint 72 to a control variable to be sent to the injection molding machine 10. For example, for a pressure or velocity setpoint 72 in setpoint profile 78*a*, the effect of the multiplication of multiplier 102 will be to create a control variable 84 in units of percent valve opening typically manifest by a voltage value. The application of the process gain is indicated by process block 106 of FIG. 6.

The control variable 84 from multiplier 102 is received by feedback error adder 103 which corrects the control variable 84 by a feedback amount 104 obtained by comparing the setpoint 72 to the returned process variable 86 subtracting the latter from the former and multiplying them by the previously determined closed loop parameter 100 in a conventional proportional feedback arrangement. The application of the closed loop error 104 is indicated by process 107 of FIG. 6. The thus produced corrected control variable 105 is then output to the valve 36 or 38 as has been previously described depending on the process variable being controlled.

As mentioned above, the control variable 105 and process variable 86 are also provided to the modeler 94 for each segment 74 so as to update the model parameter profile 96 previously described.

As the injection molding process continues, the user may store the corrected control variables 105 for a profile in a base line profile 108 indicating corrected control variables 105 for a desired operation of the system. For subsequent cycles of the injection molding process, the base line profile 108 and the control variable 84 will be compared by a CV alarm 109 as indicated by process block 110 of FIG. 6. The CV alarm 109, holds a predefined range value entered by the user beyond which the magnitude of the difference between the base line control value and actual control value 84 should not pass. The CV alarm 109 thus provides a simple comparison process and produces an alarm 111 to the user such as may be displayed on an associated terminal connected to the interface 64 of FIG. 2. The alarm 111 indicates that the change in the control value 84 has exceeded the defined limits. The purpose of the CV alarm 109 is to indicate extraordinary compensation efforts by the industrial controller 50 such as may be an early warning of a failing part such as a valve 36 or 38 or the like. For example, if the orifice of the flow valve 36 were to become clogged, the corrective effects of feedback and of learning (the latter to be described) could effectively overcome the effect of the clog by increasing the valve opening in compensation. Nevertheless, the CV alarm 109 will indicate this fact to the user so that maintenance may be undertaken such as cleaning the valve orifice. Without the CV alarm 109, the increased opening of the valve might adversely affect the accuracy of control at a next segment.

At the conclusion of each segment, the process variable value 86 and control variable value 105 are provided to an evaluator 112 which also receives the model parameter profiles 96 and determines the manifest process gain during the segment 74. The evaluator 112 monitors the process variable 86 excluding the deadtime 88 and time constant so as to not unduly bias the average of the process variable 86 during the segment 74 so as to result in underestimation of the gain. The gain value is stored in last cycle performance profile 113.

This gain value in the last cycle performance profile 113 will typically be used to correct the process gain value 81*a* during the next cycle in a process of learning. Generally the process gain 81*a* for that segment 74 is a rolling average of deduced process gains from last cycle performance profile 113 during previous injection molding cycles, the averaging performed by learning element 117.

Evaluator 112 also uses data from model parameter profile 96 to determine whether the setpoint value 72 for the particular segment was in fact physically realizable given the machine model. For example, the evaluator 112 may compare the length of the segment 74 to the deadtime 88 and time constant value 90 to see if the segment 74 was too short to allow the proper process variable value 72 to be reached. This evaluation is shown in FIG. 6 as process block 114.

If the evaluator 112 determines that the setpoint value 72 could not physically be reached, then it produces a "no-hope" signal 116 as indicated by process block 115 in FIG. 6. Simultaneously, this no-hope signal 116 is provided to a learning block 117 to suppress learning during that segment 74. Thus referring to FIG. 6, if, as indicated by decision block 115 of FIG. 6, there is no hope of the injection molding machine 10 realizing the indicated values of a setpoint 72, the control process proceeds to the next setpoint 72 as indicated at process block 101. If however, the modeling of the system indicates that the injection molding machine 10 could have attained the value of the setpoint 72, then at process block 118, learning is affected in which the process gain 81*a* is adjusted in proportion to the last cycle performance.

As has been described, the primary process variable is controlled with close loop control provided by adder 103 on a individual segment basis and with learning provided on an intercycle basis through correction of the process gain 81*a*. The present industrial controller also allows control of a secondary process variable at a secondary process variable block 120 implemented by program 66. So for example, velocity may be controlled by the primary process block 95 using velocity setpoints 72 in profile 78*a* and pressure may be controlled in a secondary process variable block 120 with pressure set points contained in profile 78*b*. Alternatively, profile 78*a* may hold pressure setpoints 72 and profile 78*b* in secondary process variable block 120 may hold velocity setpoints 72.

The secondary process variable block 120 controls its process variable in an open loop manner employing a multiplier 122 similar to multiplier 102 converting setpoint values to control variable values 124 through a set of stored process gain values 81*b* as may be entered by the user or derived from a test shot, for example, the dead headed pressure test shot described above.

Open loop control of pressure in a secondary process variable block 120 may be desirable so that pressure may be increased during initial ram movement and then decreased to prevent overpacking once ram movement has commenced. In the case of pressure control, the use of process gain values 81*b* derived from a situation where the ram deadheaded provides the highest possible pressure for a given valve setting ensuring that the actual control pressure will be no higher than this amount.

The profiles 78 and their associated parameters can be stored as a part recipe that may be loaded into the memory 62 or stored off-line when a new part is to be generated.

The preferred embodiment of the invention has been described but it will occur to those who practice the art that many modifications may be made to the preferred embodiment without departing from the spirit and scope of the invention. In order to apprise the public of the various embodiments that may fall within the scope of the invention the following claims are made.

We claim:

1. A controller for use with an injection molding machine having a ram to inject plastic material into a mold cavity during at least one injection molding cycle, the injection molding machine accepting a ram control variable signal to control the ram and providing at least one process variable signal indicating the operation of the ram, the controller comprising:

(a) input circuitry receiving the process variable signal;

(b) output circuitry providing a ram control variable signal to the injection molding machine;

(c) an electronic memory storing a user defined control profile;

(d) an electronic computer receiving the control profile from the electronic memory, the process variable signal from the input circuitry and executing a stored program to:

(i) monitor the process variable signal during operation of the injection molding machine to model the operation of the injection molding machine; and (ii) evaluating the control profile against the modeled machine to generate an indication to the user as to whether the control profile is physically achievable with the injection molding machine.

2. The controller of claim 1 wherein the electronic computer executing the stored control variable program further:

(iii) determines control variable signals corresponding to setpoints in multiple segments in the control profile; and (iv) corrects the control variable signals for a subsequent cycle of the injection molding machine based on the operation of the injection molding machine in a current cycle, only if, the control profile is determined to be physically achievable.

3. The controller of claim 2 wherein the electronic computer executing the stored control program further:

(v) generates an indication to the user if a corrected control variable signal exceeds a predetermined deviation from a baseline control variable signal.

4. The controller of claim 1 wherein the monitoring of the process variable signal is performed while the control variable signal is output to the injection molding machine for a control profile suitable for manufacturing parts.

5. The controller of claim 1 wherein the monitoring of the process variable signal is performed during execution of a predetermined test control profile not suitable for manufacturing parts.

6. The controller of claim 5 wherein the monitoring of the process variable signal is performed while the ram is immobilized.

7. A controller for use with an injection molding machine having a ram to inject plastic material into a mold cavity during at least one injection molding cycle, the injection molding machine accepting a control signal controlling the ram and producing a process variable signal, the controller comprising:

(a) input circuitry receiving the process variable signal;

(b) output circuitry providing a control signal to the injection molding machine;

(c) an electronic memory storing a user defined control profile;

(d) an electronic computer receiving the control profile from the electronic memory, the process variable signal from the input circuitry and executing a stored program to:

(i) determine control variable signals corresponding to multiple segments in a control profile; and (ii) correct the control variable signals for a subsequent cycle of the injection molding machine based on the operation of the injection molding machine in a current cycle; and (iii) generate an indication to the user if the corrected control signal exceeds a predetermined deviation from a baseline control signal.

8. The controller of claim 7 wherein the control profile includes a separate pressure control profile and velocity control profile and the control variable signals include a separate pressure control signal and velocity control signal.

9. A controller for use with an injection molding machine having a ram to inject plastic material into a mold cavity during at least one injection molding cycle, the injection molding machine accepting a control variable signal controlling the ram and producing a process variable signal, the controller comprising:

(a) input circuitry receiving the process variable signal;

(b) output circuitry providing the control variable signal to the injection molding machine;

(c) an electronic memory storing a user defined control profile;

(d) an electronic computer receiving the control profile from the electronic memory, the process variable signal from the input circuitry and executing a stored program to:

(i) monitor the process variable to evaluate a transient time between a providing of the injection molding machine with a control signal and a response by the injection molding machine;

(ii) determine control signals corresponding to multiple segments in a control profile; and (iii) correct the control variable signals for a subsequent cycle of the injection molding machine based on the operation of the injection molding machine in a current cycle during each segment but after the transient time.

10. The controller of claim 9 wherein correction amounts are stored in the electronic memory in an process gain profile having segments corresponding to the control profiles and where the operation of correcting the control variable signal scales the control variable signal by an amount based on a ration of the process variable signal and control variable signal of a previous injection cycle.

11. A controller for use with an injection molding machine having a ram to inject plastic material into a mold cavity during at least one stage of an injection molding cycle, the injection molding machine accepting a pressure control signal and a velocity control signal controlling the ram and producing a pressure sensor signal and a position sensor signal indicating the operation of the ram, the controller comprising:

(a) input circuitry receiving the pressure sensor signal and position sensor signal;

(b) output circuitry providing the pressure control signal and the velocity control signals to the injection molding machine;

(c) an electronic memory storing a user defined pressure profile and user defined velocity profile each having multiple corresponding segments defining a sequence of independent pressures and velocities;

(d) an electronic computer receiving the pressure profile and velocity profile from the electronic memory, and receiving the pressure sensor signal and position sensor signal from the input circuitry and executing a stored program to:

(i) simultaneously read the segments of the pressure profile and the velocity profile and output corresponding pressure control signals and velocity control signals to the injection molding machine based on the read segments;

whereby the pressure on the ram may be changed as its velocity is controlled.

12. The controller of claim 11 wherein the execution of the stored program further caused the electronic computer to:

(ii) monitor at least one of the pressure sensor signal and position sensor signal during operation of the injection molding machine to determine a process gain of the injection molding machine; and (iii) determine at least one of the pressure control signals and velocity control signals open loop from the pressure values and the velocity values of the segments based on the modeled operation of the machine.

13. The controller of claim 12 wherein the monitoring of the pressure sensor signal and position sensor signal is performed while the control signal is output to the injection molding machine for a control profile.

14. The controller of claim 12 wherein the monitoring of the pressure sensor signal and position sensor signal is performed during execution of a predetermined test control profile.

15. The controller of claim 12 wherein the monitoring of the pressure sensor signal is performed while the ram is immobilized.

* * * * *